(12) United States Patent
Jin et al.

(10) Patent No.: US 12,529,747 B2
(45) Date of Patent: Jan. 20, 2026

(54) ASYMMETRIC RF PULSE FOR A MAGNETIC RESONANCE IMAGING SYSTEM

(71) Applicants: Siemens Healthineers AG, Forchheim (DE); The University of Melbourne, Victoria (AU)

(72) Inventors: Jin Jin, Chapel Hill (AU); Daniel Staeb, Port Melbourne (AU); Didi Chi, Melbourne (AU); Yasmin Blunck, Brunswick West (AU); Leigh Johnston, Brunswick West (AU)

(73) Assignees: Siemens Healthineers AG, Forchheim (DE); The University of Melbourne, Victoria (AU)

( * ) Notice: Subject to any disclaimer, the term of this patent is extended or adjusted under 35 U.S.C. 154(b) by 240 days.

(21) Appl. No.: 18/522,566

(22) Filed: Nov. 29, 2023

(65) Prior Publication Data
US 2024/0175958 A1 May 30, 2024

Related U.S. Application Data

(60) Provisional application No. 63/385,465, filed on Nov. 30, 2022.

(51) Int. Cl.
*G01V 3/00* (2006.01)
*G01R 33/54* (2006.01)
(Continued)

(52) U.S. Cl.
CPC ..... *G01R 33/56366* (2013.01); *G01R 33/543* (2013.01); *G01R 33/5608* (2013.01)

(58) Field of Classification Search
CPC .............. G01R 33/287; G01R 33/4835; G01R 33/5608; A61B 2090/374
(Continued)

(56) References Cited

U.S. PATENT DOCUMENTS
10,859,655 B2 12/2020 Jin et al.

FOREIGN PATENT DOCUMENTS
WO WO-2007066204 A2 * 6/2007 ....... G06K 19/07771

OTHER PUBLICATIONS

Hurley Aaron C. et al: "Tailored RF Pulse for Magnetization Inversion at Ultrahigh Field", Magnetic Resonance in Medicine 63:51-58 (2010), pp. 51-58; 2010.
(Continued)

*Primary Examiner* — Walter L Lindsay, Jr.
*Assistant Examiner* — Frederick Wenderoth
(74) *Attorney, Agent, or Firm* — Banner & Witcoff, Ltd.

(57) ABSTRACT

For constructing an asymmetric RF pulse for an MRI system, a first RF amplitude for a first part of a time interval is determined and an RF amplitude curve, which depends on at least one RF curve parameter is received. A combined RF amplitude curve for the time interval is determined by combining the first RF amplitude for the first part of the time interval and the RF amplitude curve for a second part of the time interval, which succeeds the first part of the time interval. The combined RF amplitude curve is optimized using a loss function, which comprises an energy loss term, which depends on a pulse energy of the combined RF amplitude curve, and using the at least one RF curve parameter as at least one optimization variable. A combined amplitude of the asymmetric RF pulse is given by the optimized combined RF amplitude curve.

20 Claims, 5 Drawing Sheets

(51) Int. Cl.
*G01R 33/56* (2006.01)
*G01R 33/563* (2006.01)

(58) Field of Classification Search
USPC .......................................................... 324/309
See application file for complete search history.

(56) References Cited

OTHER PUBLICATIONS

Tannus Alberto et al.: "Adiabatic Pulses", in NMR Inbiomedicine, vol. 10, pp. 423-434; 1997.
Roger J. Ordidge, et al., "Frequency Offset Corrected Inversion (FOCI) Pulses for Use in Localized Spectroscopy"; Department of Medical Physics and Bioengineering, University College London, United Kingdom; the Departments of Neurology and Biomedical Engineering, University of Alabama, Birmingham, Alabama and the National Society for Epilepsy, Gerrards Cross, Buckinghamshire, United Kingdom; Feb. 19, 1996; pp. 562-566.

\* cited by examiner

ASYMMETRIC RF PULSE FOR A MAGNETIC RESONANCE IMAGING SYSTEM

CROSS-REFERENCE TO RELATED APPLICATIONS

The present application claims priority to and the benefit of U.S. provisional patent application no. 63/385,465, filed on Nov. 30, 2022, the contents of which are incorporated herein by reference in their entirety.

TECHNICAL FIELD

The present disclosure concerns a computer implemented method for constructing an asymmetric radio frequency (RF) pulse for a magnetic resonance imaging (MRI) system, a method for operating an RF system of an MRI system, a data processing apparatus, a magnetic resonance imaging system, and a computer program product.

BACKGROUND

Magnetic resonance (MR) based perfusion imaging is an important technique, for example for the non-invasive diagnosis of various vascular diseases. MR perfusion is considered beneficial, for example because of the use of endogenous contract agent, namely in-flow of blood being magnetically labeled using RF pulses and gradient pulses produced by the MRI system. This technique is denoted as arterial spin labeling (ASL). However, one issue is that the labeling pulses, when employed in ASL applications at high magnetic ground fields, for example 7 T, are intensive in terms of RF energy and sensitive to B0- and B1-field inhomogeneities.

Document U.S. Pat. No. 10,859,655 B2 discloses a method, which includes determination of a first gradient-modulated offset-independent adiabaticity (GOIA) pulse associated with a first bandwidth and a first gradient strength, determination of a second gradient-modulated offset-independent adiabaticity pulse associated with a second bandwidth less than the first bandwidth and a second gradient strength less than the first gradient strength, determination of a third asymmetric adiabatic pulse based on the first gradient-modulated offset-independent adiabaticity pulse and the second gradient-modulated offset-independent adiabaticity pulse, and control of a radio frequency system and gradient system to apply the third asymmetric adiabatic pulse to patient tissue. An asymmetric selective inversion pulse is provided having an accurate inversion profile on a first side of an inversion band, while having a less accurate inversion profile on a second side of the inversion band. The relaxed performance requirement on the second side is used to shorten the overall pulse duration, reduce peak RF amplitude, and reduce the resulting RF energy deposition, which may for example be given by or depend on the specific absorption rate (SAR).

SUMMARY

There exists a need to provide a possibility to construct an RF pulse for an MRI system, e.g. for ASL, which reduces RF energy deposition and/or achieves a more accurate inversion profile in a critical part of patient tissues. This need is addressed by the respective subject matter of the aspects as described herein, including the claims.

Aspects of the present disclosure are based on the idea to determine a combined RF amplitude curve for a time interval by combining a first RF amplitude for a first part of the time interval and an RF amplitude curve for a second part of the time interval, and to optimize the combined RF amplitude curve using a loss function, which comprises an energy loss term. A combined amplitude of the RF pulse for the entire time interval is given by the optimized combined RF amplitude curve.

According to an aspect of the disclosure, a computer implemented method for constructing an asymmetric radio frequency (RF) pulse for an RF system of a magnetic resonance imaging (MRI) system is provided. The computer implemented method comprises determining a first RF amplitude for a predefined first part of a predefined time interval and receiving an RF amplitude curve, which depends on at least one RF curve parameter. The computer implemented method comprises determining a combined RF amplitude curve for the time interval, e.g. for the entire time interval, by combining the first RF amplitude for the first part of the time interval and the RF amplitude curve for a predefined second part of the time interval, which succeeds, e.g. directly succeeds, the first part of the time interval. The computer implemented method comprises optimizing the combined RF amplitude curve using a loss function, which comprises an energy loss term, which depends on a pulse energy of the combined RF amplitude curve, and using the at least one RF curve parameter as at least one optimization variable. The computer implemented method comprises determining the asymmetric RF pulse such that a combined amplitude of the asymmetric RF pulse for the time interval, e.g. for the entire time interval, is given by the optimized combined RF amplitude curve.

Unless stated otherwise, all steps of the computer-implemented method may be performed by a data processing apparatus, which may comprise at least one computing unit (e.g. a computer, controller, processing circuitry, processors, etc.). For example, the at least one computing unit may be configured or adapted to perform the steps of the computer-implemented method. For this purpose, the at least one computing unit may for example store a computer program comprising instructions which, when executed by the at least one computing unit, cause the at least one computing unit to execute the computer-implemented method. A computing unit may comprise for example one or more computing circuits and/or processing circuits and/or processors for performing the steps of the computer-implemented method.

Constructing the asymmetric RF pulse may comprise determining the combined amplitude of the asymmetric RF pulse as described. Constructing the asymmetric RF pulse may, in other embodiments, however, also include determining a frequency of the asymmetric RF pulse as a function of time during the time interval. The frequency of the asymmetric RF pulse as a function of time during the whole time interval may also be denoted as combined RF frequency or as RF frequency modulation function for the RF pulse.

The time interval can be understood as an interval $[0, T]$, wherein $T$ is the total duration of the time interval, $[0, T']$ is the first part of the time interval, $[T', T]$ is the second part of the time interval, and $0<T'<T$. That the asymmetric RF pulse is asymmetric can for example be understood such that the combined amplitude of the asymmetric RF pulse is not symmetric in the time interval around $T/2$ and/or the frequency of the asymmetric RF pulse is not symmetric in the time interval around $T/2$.

The first RF amplitude is denoted as such, since it is given for the first part of the time interval. It is e.g. a function of time during the first part of the time interval. It can for example be understood as an envelope for the amplitude of the RF pulse during the first part of the time interval, which does not depend on any variables or parameters except for the time t. The RF amplitude curve is a curve that depends on the time and on the at least one RF curve parameter. The RF amplitude curve is, in general, defined for the entire time interval but can be used also for the optimization only during the first part of the time interval. By optimizing the combined RF amplitude curve, optimal values are determined at least for the at least one RF curve parameter. Thus, when using the optimal values in the combined RF amplitude curve, the combined amplitude of the asymmetric RF pulse results. The combined RF amplitude is denoted as such, since it is given for the entire time interval. The combined RF amplitude is e.g. a function of time during the entire time interval. The combined RF amplitude may for example be understood as an envelope for the amplitude of the RF pulse during the entire time interval, which does not depend on any variables or parameters except for the time t. The combined RF amplitude may also be denoted as an RF amplitude modulation function for the RF pulse.

The first RF amplitude may be determined in different ways, which may for example include known methods. In other words, the amplitude of the asymmetric RF pulse may be given by a known waveform for the first part of the time interval. However, in the remainder of the present disclosure, specific ways to determine the first RF amplitude will be described with respect to specific embodiments of the disclosure.

Combining the first RF amplitude for the first part of the time interval and the RF amplitude curve for the second part of the time interval may be understood such that the resulting combined RF amplitude curve is a piecewise-defined function, which is given by the first RF amplitude in the first part of the time interval and by the RF amplitude curve in the second part of the time interval.

For optimizing the combined RF amplitude curve, the optimization variables including the at least one RF curve parameter are, for example, varied for a plurality of iterations and the loss function is evaluated accordingly for each iteration. The iterations are terminated once the value of the loss function meets a predefined termination or a convergence criterion. Various optimization methods are known and can be used for this purpose, including, for example, a particle swarm optimization, a Monte-Carlo optimization, a gradient descent optimization, and so forth.

For example, the optimization minimizes the loss function. The larger the pulse energy, the larger is the value of the energy loss term and the larger is the value of the loss function. Since the loss function may, in some embodiments, also comprise further terms and/or the optimization may be subject to predefined constraints, the minimization of the loss function does not necessarily also minimize the energy loss term. However, pulse energy of the optimized combined RF amplitude curve is, in general, smaller compared to a hypothetic scenario where the combined RF amplitude curve would not be optimized or would not be optimized by using the energy loss term. Consequently, the optimized combined RF amplitude curve yields an RF pulse, which has a reduced pulse energy and the energy deposition to the patient may therefore be reduced.

In several embodiments, the RF amplitude curve is given by:

$$F1(t) \sim \text{sech}(\beta'' T(t)),$$

wherein t denotes the time, $T(t)$ represents a predefined time-driving function, $\beta''$ represents a first RF curve parameter of the at least one RF curve parameter, and sech( ) denotes the hyperbolic secant function.

For example, F1(t) may be scaled by the peak $B1^+$ amplitude, $B^+_{inv}$, to obtain the RF amplitude curve.

The time driving function may, in some embodiments, be the identity function $T(t)=t$. In other embodiments, the time driving function is given by:

$$T(t) = \frac{\tau_1 t^5 + \tau_2 t^3 + t}{\tau_1 + \tau_2 + 1},$$

wherein $\tau_1$ represents a second RF curve parameter of the at least one RF curve parameter, and $\tau_2$ represents a third RF curve parameter of the at least one RF curve parameter.

In such embodiments, an increased number of parameters for adjusting the shape of the RF amplitude is considered, e.g. as optimization variables, which leads to an increased performance of the RF amplitude.

In several embodiments, the asymmetric RF pulse is a nuclear spin inversion pulse, e.g. for ASL, or a refocusing pulse.

For example, the asymmetric RF pulse is a gradient-modulated pulse. In other words, in addition to the RF pulse itself, a slice selection gradient for the gradient-modulation is applied during the time interval.

In several embodiments, the computer implemented method for constructing the asymmetric RF pulse also comprises determining the gradient amplitude for the slice selection gradient during the time interval.

In several embodiments, the computer implemented method for constructing the asymmetric RF pulse also comprises determining a frequency of the asymmetric RF pulse as a function of time for the time interval. The frequency of the asymmetric RF pulse may for example be derived from the gradient amplitude and the RF amplitude.

In several embodiments, the computer implemented method further comprises receiving a predefined target magnetization profile for at least one tissue of a patient, for example for all tissues in a predefined labeling region of the patient. Optimizing the combined RF amplitude curve comprises, for each iteration of a plurality of iterations, determining a current combined RF amplitude curve by selecting a respective current value for each of the at least one RF curve parameter. An estimated magnetization profile is determined depending on the current combined RF amplitude curve, which is determined for the respective iteration. The loss function comprises a deviation loss term, which depends on a deviation of the estimated magnetization profile from the target magnetization profile.

Consequently, it is achieved that the asymmetric RF pulse does not only lead to a reduced energy deposition to the patient tissues, but also to an improved accuracy of the resulting magnetization of the patient tissues with respect to the target magnetization profile, which improves the reliability of the ASL.

The at least one tissue, e.g. the labeling region, may for example contain a liquid tissue, e.g. blood. The magnetization of the at least one tissue may for example include a magnetization of blood water. The magnetization is for example a magnetization in z-direction, which is a direction of the polarizing main magnetic field, also denoted as B0, generated by a main magnet the MRI system.

The estimated magnetization profile may for example be determined by using a simulation or numerical method for solving the respective Bloch equations depending on the current combined RF amplitude curve and, for example, a corresponding current combined gradient amplitude curve and/or a corresponding current combined RF frequency curve, which is computed depending on the current combined gradient amplitude curve and the current combined RF amplitude curve.

The simulation or numerical method may for example also use respective values for B0 and B1 to determine the estimated magnetization profile. For a given iteration of the plurality of iterations, the estimated magnetization profile may be determined for a given B0 and a given B1 or for a plurality of predefined combinations of different values for B0 and/or B1. In the latter case, the loss function may comprise a sum or weighted sum or average of the deviation loss term evaluated for the plurality of combinations of different values for B0 and/or B1.

The deviation of the estimated magnetization profile from the target magnetization profile may, for example, comprise or consist of a mean squared error or a root mean squared error or a mean absolute deviation or another error measure of the estimated magnetization profile with respect to the target magnetization profile.

In several embodiments, the computer implemented method further comprises receiving the predefined target magnetization profile. Optimizing the combined RF amplitude curve comprises, for each iteration of the plurality of iterations, determining the current combined RF amplitude curve by selecting the respective current value for each of the at least one RF curve parameter. The estimated magnetization profile is determined depending on the current combined RF amplitude curve, which is determined for the respective iteration. The loss function comprises, alternatively or in addition to the deviation loss term, smoothness loss term, which depends on a smoothness of the estimated magnetization profile.

Consequently, it is achieved that the asymmetric RF pulse does not only lead to a reduced energy deposition to the patient's body but also to an improved smoothness of the resulting magnetization profile of the patient tissues in the labelling region, which improves the imaging quality.

In case the estimated magnetization profile is determined for a plurality of predefined combinations of different values for B0 and/or B1, the loss function may comprise a sum or weighted sum or average of the smoothness loss term evaluated for the plurality of combinations of different values for B0 and/or B1.

In several embodiments, the smoothness loss term is given by:

$$L_{sm} = \Sigma_{i=1}^{N} |V_i - V_{i-1}|,$$

wherein the total number of discrete positions $i=1, \ldots, N$ at which the estimated magnetization is determined is N, and $V_i$ denotes the estimated magnetization at the position i. $V_0$ may be predefined.

In several embodiments, determining the first RF amplitude comprises optimizing the RF amplitude curve using a further loss function and using the at least one RF curve parameter as at least one further optimization variable. The first RF amplitude is determined as or, in other words, is given by the optimized RF amplitude curve.

In an embodiment, the optimization of the RF amplitude curve using further loss function is carried out before the combined RF amplitude curve is determined and optimized using the loss function. For example, the optimization of the RF amplitude curve using further loss function is carried out for the entire time interval. The first RF amplitude is given by the optimized RF amplitude curve during the first part of the time interval.

In several embodiments, the further loss function does not depend on a pulse energy of the RF amplitude curve, e.g. does not explicitly depend on the pulse energy of the RF amplitude curve. In other words, the further loss function does not comprise an energy loss term as described for the loss function.

Consequently, the pulse energy of the RF pulse is not restricted by the further optimization for the first part of the time interval but is restricted by the energy loss term used in the loss function. Thus, the accuracy and/or the smoothness of the resulting magnetization profile is increased for the first part of the time interval.

It was found that the magnetization profile can be considered to comprise a critical part corresponding to a critical part of an inversion band in the patient's body, where the magnetization profile should be as accurate and/or smooth as possible, and a non-critical part corresponding to a non-critical part of the inversion band, where the requirements regarding accuracy and/or smoothness can be relaxed. In said implementations, this is explicitly exploited by including the energy loss term in the loss function, but no such energy loss term in the further loss function. As a consequence, the total energy deposition can be reduced without significantly reducing the accuracy and/or smoothness of the magnetization profile in the critical part of the inversion band.

In several embodiments, optimizing the RF amplitude curve comprises, for each further iteration of a plurality of further iterations, determining a current RF amplitude curve by selecting a respective current value for each of the at least one RF curve parameter, and determining a further estimated magnetization profile depending on the current RF amplitude curve, which is determined for the respective further iteration. The further loss function comprises a further deviation loss term, which depends on a deviation of the further estimated magnetization profile from the target magnetization profile, and/or a further smoothness loss term, which depends on a smoothness of the further estimated magnetization profile.

The explanations above with respect to the deviation loss term and the smoothness loss term carry over analogously to the further deviation loss term and the further smoothness loss term, respectively.

In several embodiments, the further loss function does depend on the pulse energy of the RF amplitude curve, e.g. does explicitly depend on the pulse energy of the RF amplitude curve.

In other words, the further loss function may comprise an energy loss term as described for the loss function in such embodiments. Consequently, the flexibility to shape the RF pulse is increased.

In several embodiments, the asymmetric RF pulse is a gradient-modulated pulse. A first gradient amplitude curve, which depends on at least one gradient curve parameter, is received. Optimizing the RF amplitude curve to determine the first RF amplitude comprises jointly optimizing the RF amplitude curve and the first gradient amplitude curve using the further loss function and using the at least one RF curve parameter and the at least one gradient curve parameter as further optimization variables. The slice selection gradient for the gradient-modulation of the RF pulse for the first part of the time interval is given by the optimized first gradient amplitude curve.

Since the magnetization profile depends on the slice selection gradient and the frequency of the RF pulse, an increased accuracy of the magnetization profile is achieved in such embodiments.

In several embodiments, a frequency of the RF pulse for the first part of the time interval is determined depending on the optimized RF amplitude curve and the optimized first gradient amplitude curve.

In some embodiments, the frequency of the RF pulse for the first part of the time interval is optimized jointly with the first RF amplitude curve for the first time interval and the first gradient amplitude curve.

In several embodiments, the frequency is derived by solving the differential equation proposed in the publication A. Tannús and M. Garwood: "Adiabatic pulses.", NMR Biomed. 1997 December, 10(8), 423-34, which results in:

$$F2(t) = \frac{\gamma^2 B_{1,inv}^{+2}}{Q} F3(t) \left[ \int_{-1}^{t} \frac{F1^2(t')}{F3(t')} dt' - \int_{-1}^{0} \frac{F1^2(t')}{F3(t')} dt' \right],$$

wherein in this equation, F1 denotes the optimized RF amplitude curve and F3 denotes the optimized first gradient amplitude curve. γ denotes the Larmor frequency, $B_{1,inv}^{+}$ denotes the peak amplitude of the transverse component of the magnetic field, also denoted as transmit RF field, and Q represents a predefined adiabaticity constant.

In several embodiments, the first gradient amplitude curve is given by:

$$F3_1(t) = f\mathrm{sech}(\beta T(t)),$$

wherein β denotes a first gradient curve parameter of the at least one gradient curve parameter, and f denotes a second gradient curve parameter of the at least one gradient curve parameter. T(t) represents the time driving function explained above with respect to F1(t).

For example, $F3_1(t)$ may be scaled by the amplitude of the slice-selective gradient $G_{max}$ to obtain the first gradient amplitude curve.

In several embodiments, a second gradient amplitude curve, which depends on at least one further gradient curve parameter, is received. A combined gradient amplitude curve for the time interval is determined by combining the optimized first gradient amplitude curve for the first part of the time interval and the second gradient amplitude curve for the second part of the time interval. Optimizing the combined RF amplitude curve comprises jointly optimizing the combined RF amplitude curve and the combined gradient amplitude curve using the at least one RF curve parameter and the at least one further gradient curve parameter as optimization variables. The slice selection gradient for the gradient-modulation of the RF pulse for the time interval, e.g. for the entire time interval, is given by the optimized combined gradient amplitude curve.

In several embodiments, the frequency of the RF pulse for the time interval is determined depending on the optimized combined RF amplitude curve and the optimized combined gradient amplitude curve. The equation for F2(t) above can be used.

In several embodiments, the second gradient amplitude curve is given by:

$$F3_2(t) = \frac{1-f'}{1-f'+\delta f}(1-(f'-\delta f)\mathrm{sech}(\beta' T'(t))),$$

wherein β' denotes a first further gradient curve parameter of the at least one further gradient curve parameter, and δf denotes a second further gradient curve parameter of the at least one further gradient curve parameter. f' is a constant, which is given by the result of the optimization of $F3_1$ for f. One can also reformulate:

$$\frac{1-f'}{1-f'+\delta f} = \frac{1-f'}{1-f''},$$
$$f' - \delta f = f'',$$

wherein f" is defined as (f'–δf). However, for the optimization of the combined gradient amplitude curve, only δf is used as a variable, while f' remains constant.

For instance, $F3_2(t)$ may be scaled by the amplitude of the slice-selective gradient $G_{max}$ to obtain the second gradient amplitude curve.

T'(t) represents a further time driving function, which may be constructed identically to T(t) mentioned above but, for example, may have different parameter values.

If T'(t) is given by:

$$T'(t) = \frac{\tau_1' t^5 + \tau_2' t^3 + t}{\tau_1' + \tau_2' + 1},$$

then the parameters $\tau'_1$ and $\tau'_2$ are treated as optimization variables in $F3_2$ for the optimization of the combined gradient amplitude curve.

In several embodiments, jointly optimizing the combined RF amplitude curve and the combined gradient amplitude curve comprises, for each iteration of the plurality of iterations, determining the current combined RF amplitude curve by selecting the respective current value for each of the at least one RF curve parameter, determining a current combined gradient amplitude curve by selecting a respective current value for each of the at least one further gradient curve parameter, and determining the estimated magnetization profile depending on the current combined RF amplitude curve and depending on the current combined RF amplitude curve determined for the respective iteration.

In several embodiments, jointly optimizing the RF amplitude curve and the gradient amplitude curve comprises, for each further iteration of the plurality of further iterations, determining the current RF amplitude curve by selecting the respective current value for each of the at least one RF curve parameter, determining a current first gradient amplitude curve by selecting a respective current value for each of the at least one gradient curve parameter, and determining the further estimated magnetization profile depending on the current RF amplitude curve and the current first gradient amplitude curve determined for the respective further iteration.

According to a further aspect of the present disclosure, a method for operating an RF system of an MRI system is provided. Therein, a computer implemented method for constructing an asymmetric radio RF pulse according to said aspect of the present disclosure is carried out. The RF system is controlled to apply the asymmetric RF pulse to a target material to be imaged, e.g. the asymmetric RF pulse and the slice selection gradient.

According to a further aspect of the present disclosure, a data processing apparatus comprising at least one computing unit, which is configured to carry out a computer implemented method for constructing an asymmetric RF pulse according to said aspect of the present disclosure.

In the present disclosure, a computing unit may e.g. be understood as a data processing device, which comprises processing circuitry. The computing unit can therefore e.g. process data to perform computing operations. This may also include operations to perform indexed accesses to a data structure, for example a look-up table (LUT).

In an embodiment, the computing unit may include one or more computers, one or more microcontrollers, and/or one or more integrated circuits, for example, one or more application-specific integrated circuits (ASICs), one or more field-programmable gate arrays (FPGAs), and/or one or more systems on a chip (SoCs). The computing unit may also include one or more processors, for example one or more microprocessors, one or more central processing units (CPUs), one or more graphics processing units (GPUs), and/or one or more signal processors, e.g. one or more digital signal processors (DSPs), etc. The computing unit may also include a physical or a virtual cluster of computers or other of said units.

In various embodiments, the computing unit includes one or more hardware and/or software interfaces and/or one or more memory units.

A memory unit may be implemented as a volatile data memory, for example a dynamic random access memory (DRAM), or a static random access memory (SRAM), or as a non-volatile data memory, for example a read-only memory (ROM), a programmable read-only memory (PROM), an erasable programmable read-only memory (EPROM), an electrically erasable programmable read-only memory (EEPROM), a flash memory or flash EEPROM, a ferroelectric random access memory (FRAM), a magnetoresistive random access memory (MRAM), a phase-change random access memory (PCRAM), etc.

According to a further aspect of the present disclosure, a magnetic resonance imaging system is provided. The MRI system comprises a housing defining a bore and a main magnet arrangement, which is configured to generate a main magnetic field within the bore. The MRI system comprises an RF system, which is configured to apply an asymmetric RF pulse to a target material disposed within the bore and to receive magnetic resonance signals from the target material. The MRI system comprises a data processing apparatus according to said aspect of the present disclosure, wherein the at least one computing unit is configured to construct the asymmetric RF pulse by carrying out the computer implemented method according said aspect of the present disclosure.

In an embodiment, the MRI system may comprise a gradient system, which is configured to apply a magnetic field gradient to the target material, e.g. the slice selection gradient to modulate the asymmetric RF pulse accordingly.

Further implementations of the MRI system follow directly from the various embodiments of the computer implemented method for constructing an asymmetric RF pulse and vice versa. For instance, individual features and corresponding explanations as well as advantages relating to the various implementations of the computer implemented method for constructing an asymmetric RF pulse can be transferred analogously to corresponding implementations of the MRI system. In an embodiment, the MRI system according to the disclosure is configured or programmed to carry out the computer implemented method for constructing an asymmetric RF pulse. In an embodiment, the MRI system according to the disclosure carries out the computer implemented method for constructing an asymmetric RF pulse.

According to another aspect of the present disclosure, a computer program comprising instructions is provided. When the instructions are executed by a data processing apparatus, the instructions cause the data processing apparatus to carry out a computer implemented method for constructing an asymmetric RF pulse according to said aspect of the present disclosure.

The instructions may be provided as program code, for example. The program code can for example be provided as binary code or assembler and/or as source code of a programming language, for example C, and/or as program script, for example Python.

According to another aspect of the present disclosure, a further computer program comprising further instructions is provided. When the further instructions are executed by an MRI system, the further instructions cause the MRI system to carry out any of the methods for operating an RF system of the MRI system according to any of the aspects of the present disclosure as described herein.

According to a further aspect of the disclosure, a computer-readable storage medium, e.g. a tangible non-transitory computer-readable storage medium, storing said computer program and/or said further computer program is provided.

The computer program, the further computer program, and the computer-readable storage medium are respective computer program products with the instructions and/or the further instructions.

Further features and feature combinations of the disclosure are obtained from the figures and their description as well as the claims. In particular, further implementations of the disclosure may not necessarily contain all features of one of the claims. Further implementations of the disclosures may comprise features or combinations of features, which are not recited in the claims.

BRIEF DESCRIPTION OF THE DRAWINGS

In the following, the disclosure will be explained in detail with reference to specific exemplary implementations and respective schematic drawings. In the drawings, identical or functionally identical elements may be denoted by the same reference signs. The description of identical or functionally identical elements is not necessarily repeated with respect to different figures.

DETAILED DESCRIPTION OF THE DISCLOSURE

Figure 1:
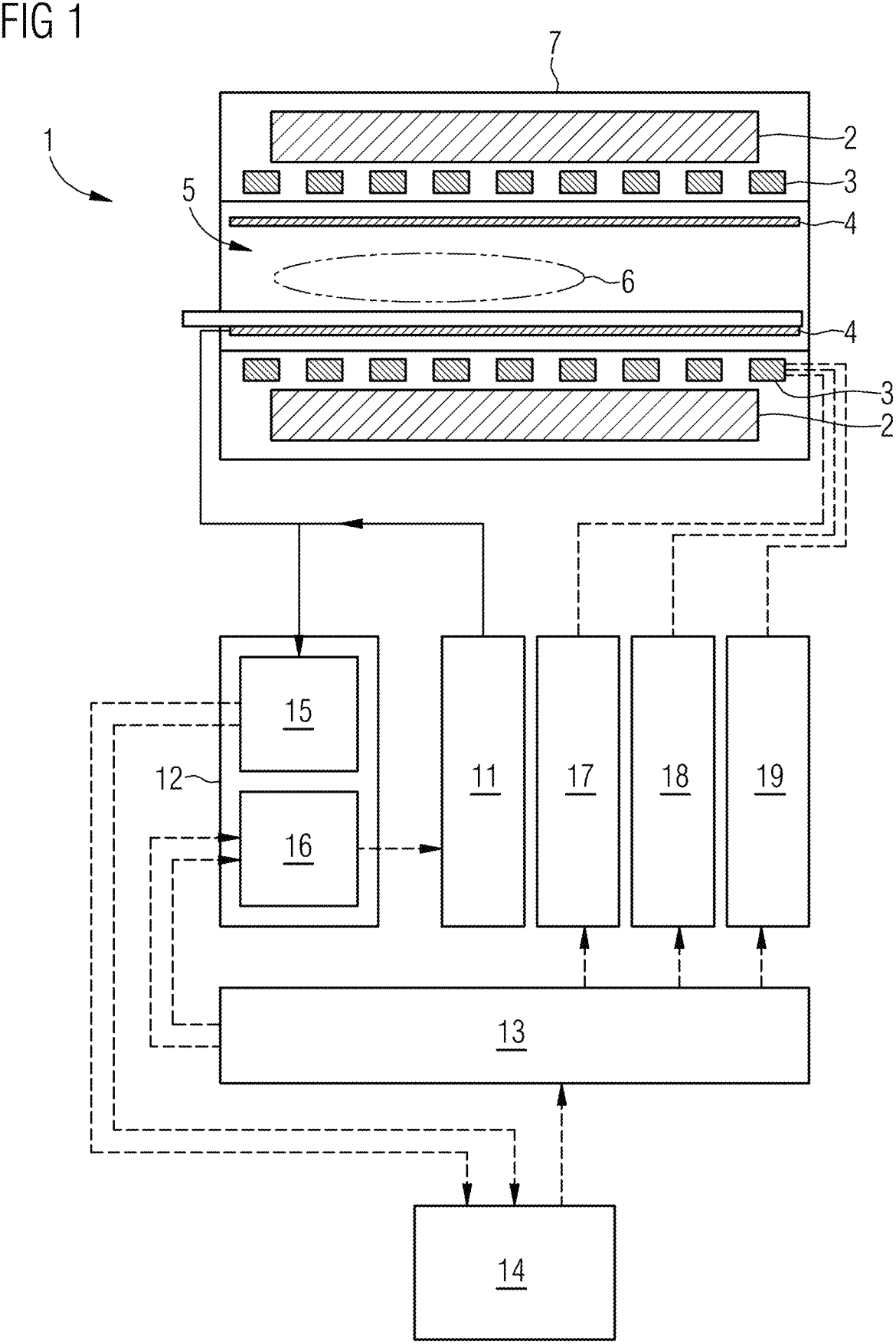
FIG. 1 illustrates schematically an exemplary embodiment of an MRI system according to the present disclosure.

FIG. 1 shows schematically an exemplary embodiment of an MRI system 1 according to the present disclosure. The MRI system 1 comprises a housing 7 defining a bore 5 and a main magnet arrangement 2, which is configured to generate a main magnetic field, also denoted as polarizing magnetic field, within the bore 5. The MRI system 1 comprises an RF system 4, 11, 12, which is configured to apply an asymmetric RF pulse to a target material, e.g. a body part of a patient 6, disposed within the bore 5 and to receive MR signals from the target material. For example, the main magnet arrangement 2 may generate a uniform main magnetic field B0 as the main magnetic field and at least one RF coil of the RF system 4, 11, 12 may emit an excitation field B1. The MRI system 1 comprises a data processing apparatus with at least one computing unit 13, 14, which is configured to construct the asymmetric RF pulse by using a computer implemented method for constructing an asymmetric RF pulse according to the present disclosure.

To this end, the at least one computing unit 13, 14 determines a first RF amplitude for a predefined first part of a predefined time interval, and receives an RF amplitude curve, which depends on at least one RF curve parameter. The at least one computing unit 13, 14 determines a combined RF amplitude curve for the time interval by combining, e.g. concatenating, the first RF amplitude for the first part of the time interval and the RF amplitude curve for a predefined second part of the time interval, which succeeds the first part of the time interval. The at least one computing unit 13, 14 carries out an optimization to optimize the combined RF amplitude curve using a loss function, which comprises an energy loss term, which depends on a pulse energy of the combined RF amplitude curve, and using the at least one RF curve parameter as at least one optimization variable. The at least one computing unit 13, 14 determines the asymmetric RF pulse, wherein a combined amplitude of the asymmetric RF pulse for the time interval is given by the optimized combined RF amplitude curve.

According to MR techniques, the target material is subjected to the main magnetic field, causing the nuclear spins in the target material to precess about the main magnetic field at their characteristic Larmor frequency. A net magnetic moment Mz is produced in the direction z of the main magnetic field, and the randomly oriented magnetic moments of the nuclear spins cancel out one another in the x-y-plane.

When the target material is then subjected to the transmit RF magnetic field, which is for example in the x-y plane and near the Larmor frequency, the net magnetic moment rotates out of the z-direction generating a net in-plane magnetic moment, which rotates in the x-y plane with the Larmor frequency. In response, MR signals are emitted by the excited spins when they return to their state before the excitation. The emitted MR signals are detected, for example by the at least one RF coil and/or one or more dedicated detection coils, digitized in a receiver channel 15 of an RF controller 12 of the RF system 4, 11, 12, and processed by at least one processor 14 of the at least one computing unit 13, 14 to reconstruct an MR image using a known MR reconstruction technique.

An RF inversion pulse, also denoted as labeling pulse, may be emitted as a preparation step in order to manipulate MR signals from certain types of tissue. For example, said inversion may be critical only for a predefined critical part of an inversion band. Consequently, the RF inversion pulse may comprise an asymmetric RF pulse according to embodiments of the computer implemented method for constructing an asymmetric RF according to the present disclosure.

In an embodiment, gradient coils 3 of the MRI system 1 may produce magnetic field gradients Gx, Gy, and Gz for position-encoding of the MR signals. Accordingly, MR signals are emitted only by such nuclei of the target material, which correspond to the particular Larmor frequency. For example, Gz is used together with a bandwidth-limited RF pulse to select a slice perpendicular to the z-direction and consequently may also be denoted as slice selection gradient. In alternative example, Gx, Gy, and Gz may be used in any predefined combination with a bandwidth-limited RF pulse to select a slice perpendicular to the vector sum of said gradient combination. The gradient coils 3 may be supplied with current by respective amplifiers 17, 18, 19 for generating the respective gradient fields in x-direction, y-direction, and z-direction, respectively. Each amplifier 17, 18, 19 may include a respective digital-to-analog converter, which is controlled by the sequence controller 13 to generate respective gradient pulses at predefined time instances.

It is noted that the components of the MRI system 1 can also be arranged differently from the arrangement shown in FIG. 1. For example, the gradient coils 3 may be arranged inside the bore 5, similar as shown for the at least one RF coil.

A sequence controller 13 of the at least one computing unit 13, 14 may control the generation of RF pulses by an emitter channel 16 of the RF controller 12 and an RF power amplifier 11 of the RF system 4, 11, 12.

The least one processor 14 may receive the real and imaginary parts from analog-digital converters of the receiver channel 15 and reconstruct the MR image based on them according to a known technique.

It is noted that each component of the MRI system 1 may include other elements that are required for the operation thereof, and/or additional elements for providing functions other than those described in the present disclosure.

In some embodiments, the proposed RF pulse may be denoted as HAPY (Hybrid Adiabatic Pulse with as Ymmetry). Generating the HAPY pulse starts with defining the pulse shapes of the critical side, which is defined similarly to the GOIA pulse introduced in the publication A. Tannús and M. Garwood: "Adiabatic pulses.", NMR Biomed. 1997 December, 10(8), 423-34.

In some embodiments, the normalized RF amplitude modulation function is given by Equation 1 below as follows:

$$F1(t)=\text{sech}(\beta T(t)), \quad \text{Eqn. 1:}$$

and the gradient modulation function is given by Equation 2 below as follows:

$$F3(t)=1-f\text{sech}(\beta T(t)). \quad \text{Eqn. 2:}$$

For example, F1 and F3 may be defined over the time interval $-1 \leq t \leq 1$ of normalized time t. Assuming a pulse duration of D ms, the physical time step in relation to the normalized time step is $(t+1)*D/2$ ms. $\beta$ may be considered as a truncation factor of the time-driving function, while f determines the minimum value of the time-varying gradient such that $F3_{min}=(1-f)$.

In some embodiments, the time-driving function T(t) is given by $t^P$ with a predefined order p. In other embodiments, the time-driving function T(t) is replaced by a monotonically increasing time-driving function expressed by Equation 3 below as follows:

$$T(t) = \frac{\tau_1 t^5 + \tau_2 t^3 + t}{\tau_1 + \tau_2 + 1}. \quad \text{Eqn. 3}$$

The latter time-driving function introduces extra degrees of freedom for defining waveform shapes. In some embodiments, different time-driving functions can be used for F1 and F3, while they are the same functions in other embodiments. In the latter case, the optimization complexity is reduced.

In practice, F1(t) may be multiplied with the peak B1+ amplitude, $B1^+_{inv}$, to achieve the RF amplitude function. Similarly, the time-varying slice-selective gradient may be defined by multiplying F3(t) by the amplitude of the slice-selective gradient $G_{max}$.

The frequency modulation function, F2(t), is derived by solving the differential equation proposed by Tannús and Garwood in above mentioned publication, to maintain an frequency-offset independent adiabaticity. Its solution has the form expressed by Equation 4 below as follows:

$$F2(t) = \frac{\gamma^2 B^{+2}_{1,inv}}{Q} F3(t) \left[ \int_{-1}^{t} \frac{F1^2(t')}{F3(t')} dt' - \int_{-1}^{0} \frac{F1^2(t')}{F3(t')} dt' \right]. \quad \text{Eqn. 4}$$

Therein, Q is the constant adiabaticity of the pulse. It may for example be adjusted such that the total frequency sweep, $\Delta F2=F2_{max}-F2_{min}$, corresponds to the inversion thickness $\Delta x$, and the maximum gradient amplitude, $G_{max}$, expressed by Equation 4 below as follows:

$$\Delta F2=\gamma G_{max} F3_{max} \Delta x. \quad \text{Eqn. 5:}$$

In some embodiments, the HAPY pulse achieves asymmetry by redefining the pulse shape functions of the non-critical edge. Without losing generality, in the following description the critical and non-critical sides of HAPY are denoted by left (L) and right (R), respectively. In an embodiment, L refers to the first part $$-1 \leq t \leq \frac{2D_L}{D}$$

of the time interval and R refers to the second part $$\frac{2D_L}{D} - 1 < t \leq 1$$

of the time interval. The total pulse duration of HAPY is given by $D=D_L+D_R$, wherein $D_L$ ms and $D_R$ ms are the pulse durations of the left and right halves, respectively, and may be predefined. The normalized HAPY amplitude modulation function is expressed by Equation 6 below as follows:

$$F1(t) = \begin{cases} F1_L(t) = \text{sech}(\beta_L T(t)), & f \text{ or } L \\ F1_R(t) = \text{sech}(\beta_R T(t)), & f \text{ or } R \end{cases} \quad \text{Eqn. 6}$$

and the HAPY gradient modulation function is expressed by Equation 6 below as follows:

$$F3(t) = \begin{cases} F3_L(t) = 1 - f_L \text{sech}(\beta_L T_L(t)), & \text{for } L \\ F3_R(t) = \frac{1-f_L}{1-f_R}(1 - f_R \text{sech}(\beta_R T_R(t))), & \text{for } R \end{cases} \quad \text{Eqn. 7}$$

are thus defined, where $1-f_L$ and $1-f_R$ determine the minimum values of $F3_L(t)$ and $F3_R(t)$, respectively. The time-driving functions are expressed by Equations 8 and 9 below as follows:

$$T_L(t) = \frac{\tau_{1L}t^5 + \tau_{2L}t^3 + t}{\tau_{1L} + \tau_{2L} + 1}, -1 \leq t \leq \frac{2D_L}{D} - 1, \quad \text{Eqn. 8}$$

$$T_R(t) = \frac{\tau_{1R}t^5 + \tau_{2R}t^3 + t}{\tau_{1R} + \tau_{2R} + 1}, \frac{2D_L}{D} - 1 < t \leq 1. \quad \text{Eqn. 9}$$

The RF amplitude function and the time varying gradient function of HAPY of both, the critical and the non-critical halves, are derived in the same way as described above.

The frequency modulation function F2(t) may for example be obtained by numerical integration based on equations 6 and 7. The integration provides a continuous frequency modulation despite that F1(t) and F3(t) are given in segmented forms. This potentially avoids the issue of concatenating two separate frequency modulation functions. The adiabaticity factors for the left and right halves of HAPY can be defined differently as expressed by Equation 10 below as follows:

$$Q^H(t) = \begin{cases} Q_L & -1 \leq t \leq \frac{2D_L}{D} - 1, \\ Q_R & \frac{2D_L}{D} - 1 < t \leq 1, \end{cases} \quad \text{Eqn. 10}$$

wherein $Q_L$ and $Q_R$ may be adjusted so that the inversion thickness is maintained at $\Delta x$.

A first loss function for the GOIA optimization may in some implementations be expressed by Equation 11 below as follows:

$$L_1 = \sum_{\Delta B0, B1} + L_{inv} + \lambda_1 L_{sm},\qquad \text{Eqn. 11}$$

which characterizes the inversion profile under several conditions for $\Delta B0$ and $B1^+$. A second loss function for the HAPY optimization may in some implementations is expressed by Equation 12 below as follows:

$$L_2 = \lambda_2 L_{SAR} + \sum_{\Delta B0, B1} + L_{inv} + \lambda_1 L_{sm},\qquad \text{Eqn. 12}$$

wherein the first part enforces a penalty on pulse energy.

Figure 3:
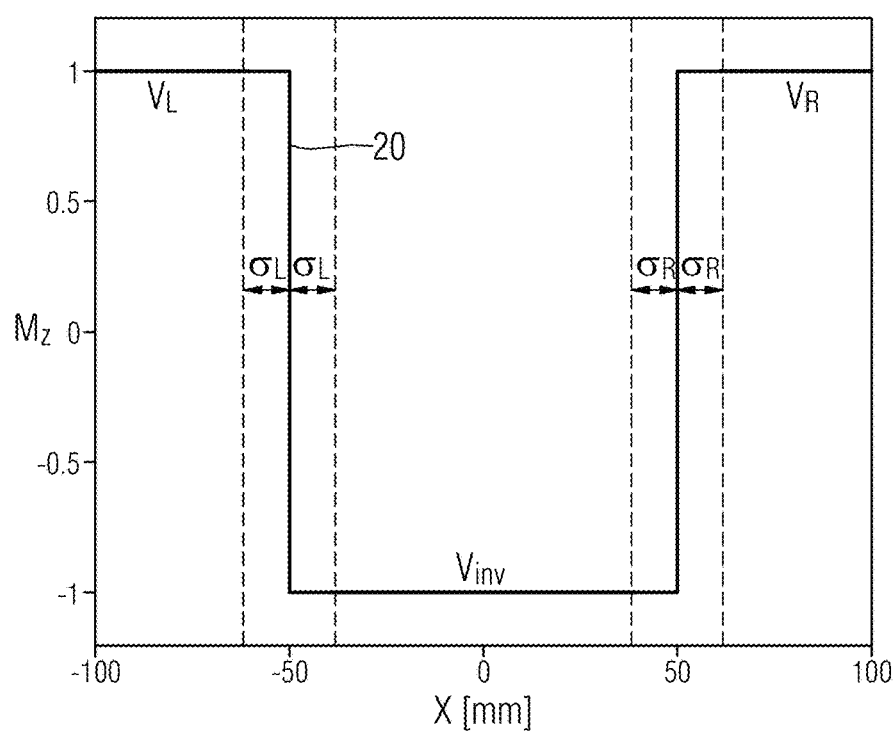
FIG. 3 illustrates schematically an example target magnetization profile.

For the second part, $\Delta x$ mm inversion profiles are evaluated at N=200 equidistant positions over a width of $2\Delta$ mm over three segments, namely a left passband ($V_L=\{V_i, 0\leq i<N/4-\sigma_L\}$), an inversion band ($V_{inv}=\{Vi, N/4+\sigma_L\leq i<3N/4-\sigma_R\}$), and right passband ($V_R=\{Vi, \sigma_R+3N/4\leq i\leq N\}$). A respective target magnetization profile 20 is shown in FIG. 3. The transition widths of the inversion profile are defined by $\sigma_L$ and $\sigma_R$. For symmetrical inversion profiles, $\sigma_L=\sigma_R$ while for asymmetric inversion profiles they may be set differently, namely $\sigma_L \neq \sigma_R$.

$L_{inv}$ quantifies the accuracy of the estimated or simulated inversion profile compared to the target inversion profile 20. In some embodiments, $L_{inv}$ is given by the summation of mean square errors between the simulated inversion profile and the target inversion profile 20 of all relevant segments.

$L_{sm}$ accounts for the smoothness of the estimated inversion profile, and may be calculated by Equation 13 below as follows:

$$L_{sm} = \sum_{i=1}^{N} |V_i - V_{i-1}|,\qquad \text{Eqn. 13}$$

A first weighting factor $\lambda_1$ may be introduced so that the penalty on the smoothness of the inversion profile can be adjusted under different evaluation conditions.

$L_{SAR}$ represents the penalty on pulse energy, which may for example be calculated in accordance with Equation 14 below as follows:

$$L_{SAR} = \int_D F1^2(t)dt.\qquad \text{Eqn. 14}$$

In other words, the penalty on pulse energy $L_{SAR}$ can thus be calculated as the integral of the square of the RF amplitude curve/shape F1(t) over the pulse duration D.

A second weighting factor $\lambda_2$ may be introduced so that the pulse energy can be adjusted in the optimization.

Figure 4:
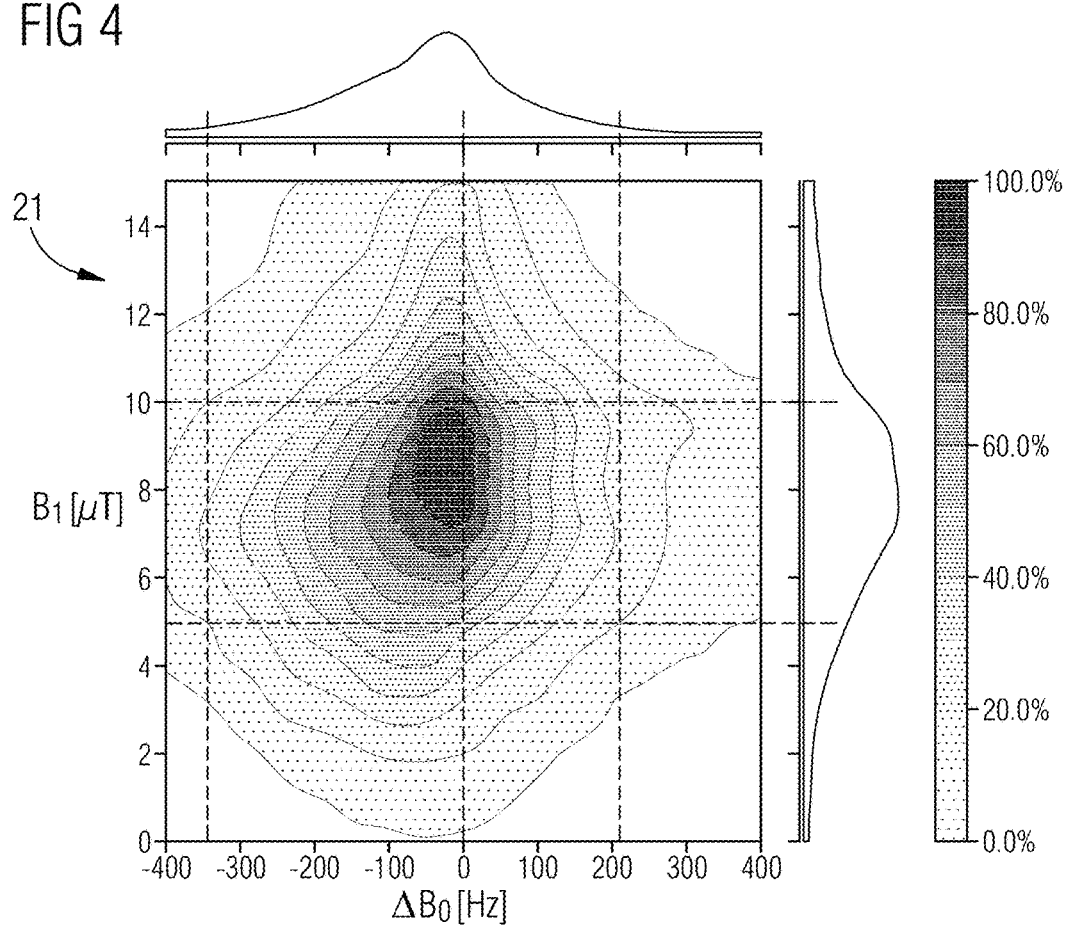
FIG. 4 illustrates schematically an example distribution of a main magnetic field inhomogeneity relative to the main magnetic field and a transmit RF magnetic field.

Realistic evaluation conditions for calculating $L_1$ and $L_2$ were determined based on in-vivo $B1^{30}$ and $\Delta B0$ values from healthy subjects. To that end, $B1^+$ maps were acquired by a pre-saturation based RF field mapping sequence with a 4-mm isotropic spatial resolution and a field of view of 256 mm×256 mm×292 mm. $\Delta B0$ maps were acquired using a double-echo GRE sequence with a spatial resolution of 4 mm×4 mm×3 mm and a field of view of 256 mm×256 mm×237 mm. The $B1^+$ were registered to the $\Delta B0$ maps. To design the labelling pulse, only the bottom half of the acquired volumes that aligned with the labelling region were considered for pulse optimization. From the $\Delta B0$ and $B1^+$, a joint histogram 21 was generated, as depicted schematically in FIG. 4, to consider $B1^+$ $\Delta B0$ conditions simultaneously.

Constructing the HAPY pulse may include a two-step optimization. In some embodiments, both steps may be executed using a particle swarm algorithm to find the optimal sets of parameters by minimizing the loss functions $L_1$ and $L_2$, respectively. In the two-step optimization, hyper-parameters including the weighting factors $\lambda_1$ and $\lambda_2$ and the widths of transition bands $\sigma_L$ and $\sigma R$ may be tuned, for example manually.

In some embodiments, in the first optimization step, the GOIA pulse may be optimized based on the definitions by Equations 1 and 2 with the five parameters [$\beta$, f, $G_{max}$, $\tau_1$, $\tau_2$] defining the pulse shape as optimization variables. Respective sets of constraints for these parameters may be provided. The loss function is $L_1$ of Equation 11.

In some embodiments, an inversion width of $\Delta x$=100 mm may be assumed in a Bloch equation simulation. Using $G_{max}$ as optimization variable with explicit constraints, for example instead of Q, may ensure that the maximum gradient amplitude does not exceed predefined hardware limitations. The pulse duration D may be predefined. In some embodiments, the transition widths of the inversion profile, $\sigma_L$ and $\sigma_R$, may be set to 5 mm to ensure a sharp transition.

In the second optimization step, the optimized GOIA pulse from the first step may for example be used as $F1_L(t)$ in Equation 6. The optimal values of four parameters [$\beta_R$, $\delta f$, $\tau_{1R}$, $\tau_{2R}$], may for example be determined using predefined sets of constraints. The intermediate parameter $\delta f$ is given by $(f_L-f_R)$. The loss function is $L_2$ of Equation 12.

In the second optimization step, the criteria on the sharpness of at the non-critical transition edge may be relaxed. For example, a different target inversion profile than for the first step may be used.

In some embodiments, the target inversion profile for the second step may have an increased $\sigma_R$ and/or a reduced pulse duration (for example $D_R$=4.8 ms versus $D_L$=6.4 ms) and/or a different set of hyper-parameters may be used.

Although the inversion width may be fixed, the effective inversion width by the right component may be reduced due to an increase in the transition width. Therefore, $G_{max}$ may be fine-tuned manually after the optimization to ensure the effective inversion width is equal to the fixed inversion width.

Figure 5:
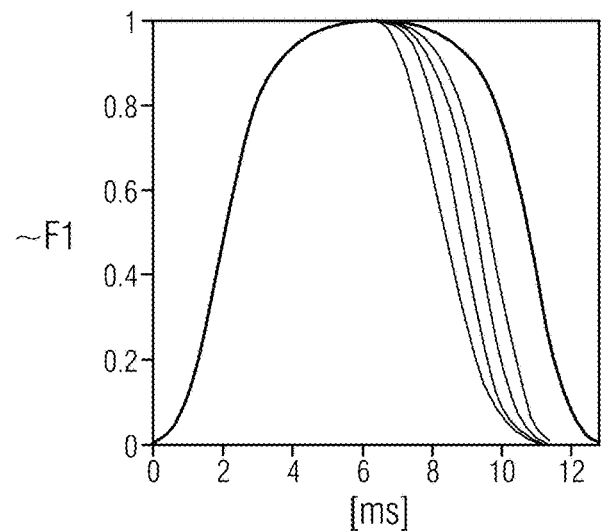
FIG. 5 illustrates schematically an example normalized RF amplitudes constructed by using a further exemplary embodiment of a computer implemented method for constructing an asymmetric RF pulse for an MRI system according to the present disclosure.
Figure 6:
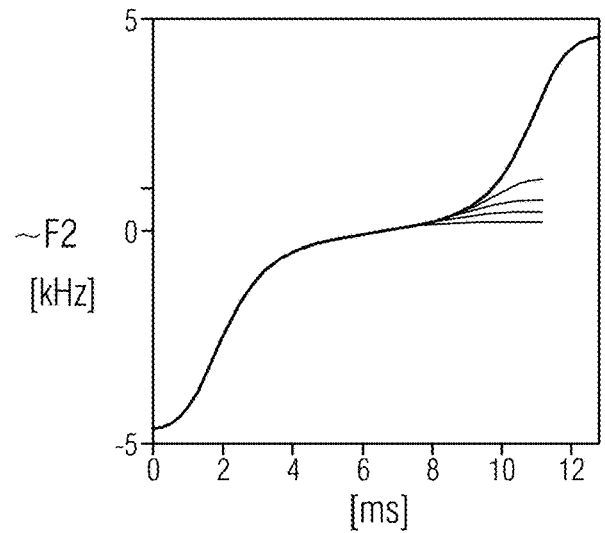
FIG. 6 illustrates schematically example RF frequencies constructed by using a further exemplary embodiment of a computer implemented method for constructing an asymmetric RF pulse for an MRI system according to the present disclosure.
Figure 7:
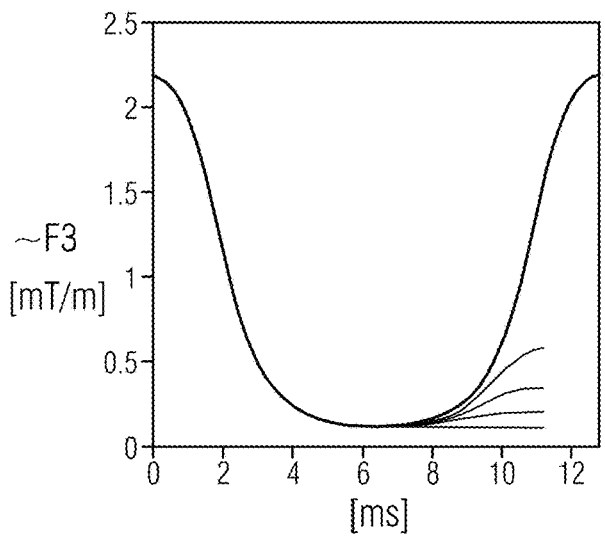
FIG. 7 illustrates schematically example slice selection gradients constructed by using a further exemplary embodiment of a computer implemented method for constructing an asymmetric RF pulse for an MRI system according to the present disclosure.
Figure 8:
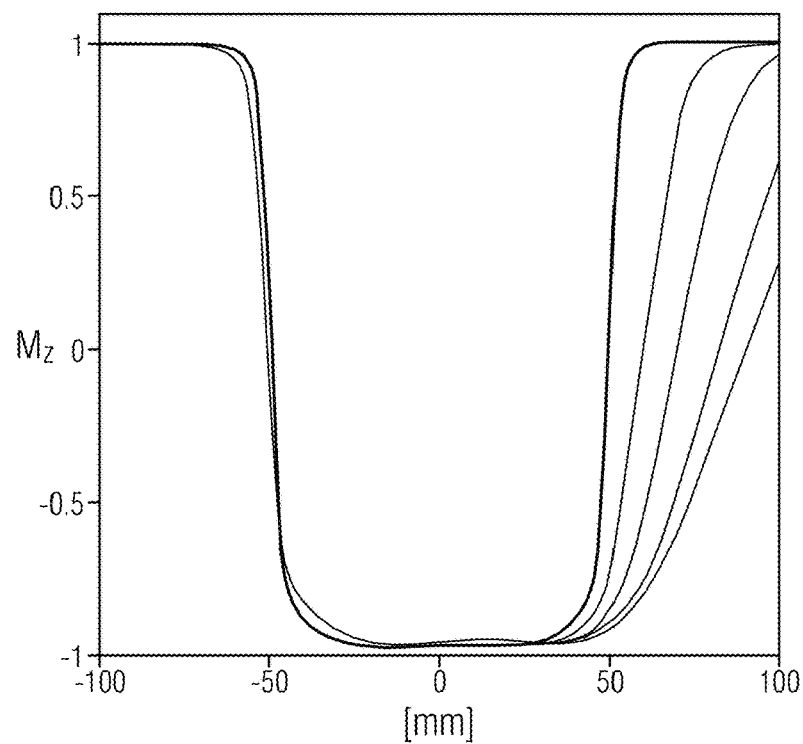
FIG. 8 illustrates schematically an example longitudinal magnetization profile estimated based on an asymmetric RF pulse constructed by using a further exemplary embodiment of a computer implemented method for constructing an asymmetric RF pulse for an MRI system according to the present disclosure.
Figure 9:
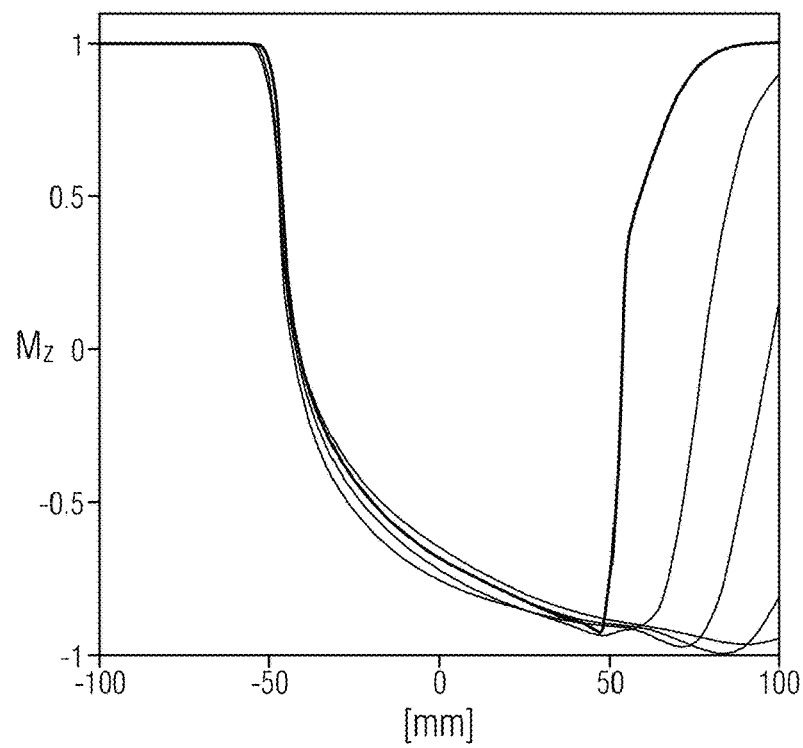
FIG. 9 illustrates schematically an example longitudinal magnetization profile estimated based on an asymmetric RF pulse constructed by using a further exemplary embodiment of a computer implemented method for constructing an asymmetric RF pulse for an MRI system according to the present disclosure.

The resulting shapes of F1(t), F2(t), and F3(t) are shown schematically in FIG. 5, FIG. 6, and FIG. 7, respectively, for different values of $\lambda_2$ including $\lambda_2$=0 for reference. FIG. 8 and FIG. 9 show the resulting inversion profiles for different values of $\lambda_2$ and for different values of B1 and $\Delta B0$ (given in terms of the resulting deviation from the Larmor frequency)

Figure 2:
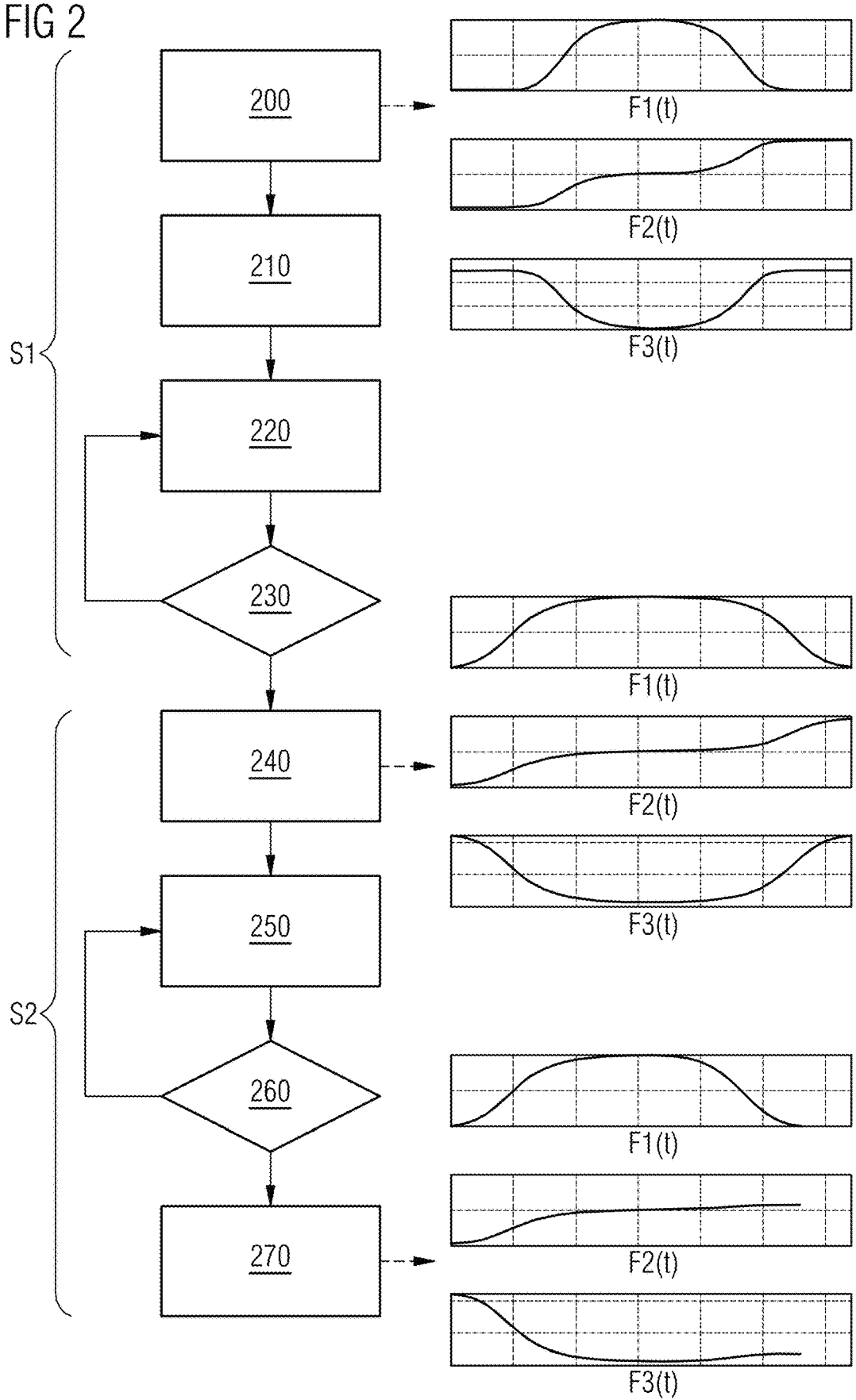
FIG. 2 illustrates a schematic flow diagram of an exemplary embodiment of a computer implemented method for constructing an asymmetric RF pulse for an MRI system according to the present disclosure.

FIG. 2 shows a schematic flow diagram of a further exemplary embodiment of a computer implemented method for constructing an asymmetric RF pulse for an MRI system according to the present disclosure. S1 and S2 denoted said first and second steps of the optimization, respectively.

In block 200 the RF amplitude modulation function F1(t) and the gradient modulation function F3(t) are defined as explained with respect to Equations 1 and 2. Those and the corresponding modulation function F2(t) of Equations 4 are shown on the right side of block 200 in FIG. 2.

In block 210, the target magnetization profile for the critical side is defined and the evaluation conditions, e.g. B1+ and ΔB0 are set. Also the hyper parameters $\lambda_1$ and $\lambda_2$ are set accordingly.

In block 220, the parameters [β, f, $G_{max}$, $\tau_1$, $\tau_2$] are set or updated and the loss function $L_1$ is evaluated. In block 230, it is checked whether a predefined convergence criterion for $L_1$ is fulfilled. Blocks 220 and 230 are repeated until this is the case.

In block 240, [$\beta_L$, f, $G_{max}$ $\tau_{1L}$, $\tau_{2L}$] are set to the optimal values obtained as a result of blocks 220 and 230. Optionally, the hyper parameters $\lambda_1$ M and $\lambda_2$ 22 may be adapted. The target magnetization profile for the non-critical side is defined. On the right side of FIG. 2 next to block 240, the resulting curves for F1(t), F2(t), and F3(t) are depicted.

In block 250, the parameters [$\beta_R$, δf, $\tau_{1R}$, $\tau_{2R}$] are set or updated and the loss function $L_2$ is evaluated. In block 260, it is checked whether a predefined convergence criterion for $L_2$ is fulfilled. Blocks 250 and 260 are repeated until this is the case.

In block 270, the resulting optimized curves for F1(t), F2(t), and F3(t) are obtained, as depicted on the right side of FIG. 2 next to step 270.

The resulting inversion profiles show that the critical halves of the inversion bands are minimally affected even when the non-critical halves were significantly modified. On the other hand, the inversion profiles of the non-critical halves can significantly reduce the amount of deposited energy.

ASL at ultra-high field strengths is known to benefit from the intrinsic SNR gain and prolonged T1 relaxation time due to the increased field strength. A major challenge is the increased energy deposition at high field strengths, which is overcome at least partly by several embodiments of the present disclosure.

Another challenge in the application of ASL at ultra-high field strength is given by inhomogeneities of B0 and B1+, which may cause reduced labelling efficiency and thus lead to spatially varied degradation in the perfusion signal strength. This is overcome at least partly by several embodiments of the present disclosure.

According to some embodiments of the present disclosure, an asymmetric RF pulse, which is also denoted as Hybrid Adiabatic Pulse with as Ymmetry (HAPY), for ASL applications, for example at main magnetic fields of 7 T or around 7 T or higher, is constructed. According to some embodiments, the HAPY pulse describes an adiabatic full passage pulse with an asymmetric inversion profile when used for slice- or slab-selective inversion. It was found that one transition band of the inversion, also denoted as non-critical side, can be relaxed in terms of selectivity (accuracy of the inversion profile) so that the HAPY pulse can achieve lower SAR and/or shorter duration, while the other transition band, also denoted as critical side, maintains a high inversion efficiency, a sharp transition, and high levels B0 and B1+ robustness.

In some embodiments, the HAPY pulse is further extended in terms of how various performance metrics of the pulse are constrained and/or regularized, and/or how B0 and B1+ inhomogeneity are considered during the optimization, and how the optimization is carried out.

In some embodiments, the proposed method may be used for pulse arterial spin labeling (PASL) and achieves a notably smaller SAR profile.

In some embodiments, a shorter repetition time TR may be employed than in conventional approaches, e.g. at high B0 applications, for example 7 T. While the high SAR profile of the labeling pulse and sometimes other typically less SAR-intensive RF pulses, for example for background suppression, TR needs to be kept longer than a certain threshold so that the time-averaged SAR complies with highly regulated limits by authorities. Reducing the SAR profile of the labeling pulse, which is facilitated by the respective embodiments of the present disclosure, allows for shorter TR and shorter overall scan time. Considering realistic conditions, practical protocols for PASL at 7 T can benefit from this advantage with shorter TR, while maintaining the same ASL signal level and the same SAR profile.

In some embodiments, the proposed labeling pulse is shorter in duration than in conventional approaches. A potential benefit is that, if the pulse duration is increased to match conventional solutions, a further reduction of SAR can be achieved with a tangible benefit as discussed above.

In some embodiments, when pulse duration is increased, the RF amplitude can be reduced. This can be beneficial in terms of meeting requirements of the RF power amplifier.

In some embodiments, the proposed labeling pulse can be used for four-dimensional MR angiography (4D-MRA). With 4D-MRA, the time after the inversion pulse is used to acquire multiple phases over the 3D volume. A shorter pulse duration allows for more acquisition during the same TR, facilitating higher spatial and/or high temporal resolution.

In some embodiments, the energy reduction may be constrained and/or variably penalized, such that different amounts of energy saving can be achieved tuning the cost of performance of, for example, the non-critical side.

Independent of the grammatical term usage, individuals with male, female or other gender identities are included within the respective terms.

The various components described herein may be referred to as "units," or "devices." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units or devices, as applicable and relevant, may alternatively be referred to herein as "circuitry," "controllers," "processors," or "processing circuitry," or alternatively as noted herein.

What is claimed is:

1. A computer implemented method for a magnetic resonance (MR) imaging system, comprising:
   computing a first radio frequency (RF) amplitude for a predefined first part of a predefined time interval;
   receiving an RF amplitude curve that depends on at least one RF curve parameter;
   computing a combined RF amplitude curve for the predefined time interval by combining the first RF amplitude for the predefined first part of the time interval and the RF amplitude curve for a predefined second part of the time interval that succeeds the predefined first part of the time interval;
   optimizing the combined RF amplitude curve in accordance with a loss function that (i) comprises an energy loss term that depends on a pulse energy of the combined RF amplitude curve, and (ii) utilizes the at least one RF curve parameter as at least one optimization variable;
   constructing an asymmetric RF pulse, wherein a combined amplitude of the asymmetric RF pulse for the time interval is represented by the optimized combined RF amplitude curve;

controlling an RF system of the MRI system to apply the asymmetric RF pulse to a target material to be imaged;

receiving MR signals of the target material based upon the application of the asymmetric RF pulse; and reconstructing an MR image based upon the received MR signals.

2. A magnetic resonance (MR) imaging system comprising:

a housing defining a bore;

a main magnet arrangement configured to generate a main magnetic field within the bore; and one or more processors configured to:
compute a first radio frequency (RF) amplitude for a predefined first part of a predefined time interval;
receive an RF amplitude curve that depends on at least one RF curve parameter;
compute a combined RF amplitude curve for the predefined time interval by combining the first RF amplitude for the predefined first part of the time interval and the RF amplitude curve for a predefined second part of the time interval that succeeds the predefined first part of the time interval;
optimize the combined RF amplitude curve in accordance with a loss function that (i) comprises an energy loss term that depends on a pulse energy of the combined RF amplitude curve, and (ii) utilizes the at least one RF curve parameter as at least one optimization variable; and
construct an asymmetric RF pulse, wherein a combined amplitude of the asymmetric RF pulse for the time interval is represented by the optimized combined RF amplitude curve; and an RF system configured to apply the asymmetric RF pulse to a target material disposed within the bore and to receive MR signals from the target material, wherein the one or more processors are further configured to reconstruct an MR image based upon the received MR signals.

3. A non-transitory computer-readable medium having instructions stored thereon that, when executed by one or more processors of a magnetic resonance (MR) imaging device, cause the MR imaging device to:

compute a first radio frequency (RF) amplitude for a predefined first part of a predefined time interval;

receive an RF amplitude curve that depends on at least one RF curve parameter;

compute a combined RF amplitude curve for the predefined time interval by combining the first RF amplitude for the predefined first part of the time interval and the RF amplitude curve for a predefined second part of the time interval that succeeds the predefined first part of the time interval;

optimize the combined RF amplitude curve in accordance with a loss function that (i) comprises an energy loss term that depends on a pulse energy of the combined RF amplitude curve, and (ii) utilizes the at least one RF curve parameter as at least one optimization variable;

construct an asymmetric RF pulse, wherein a combined amplitude of the asymmetric RF pulse for the time interval is represented by the optimized combined RF amplitude curve;

apply the asymmetric RF pulse to a target material;

receive MR signals from the target material; and reconstruct an MR image based upon the received MR signals.

4. The computer implemented method according to claim 1, further comprising:

receiving a predefined target magnetization profile for a tissue of a patient, wherein computing the combined RF amplitude curve comprises, for each iteration of a plurality of iterations:
computing a current combined RF amplitude curve by selecting a respective current value for each at least one RF curve parameter; and
computing an estimated magnetization profile depending on the current combined RF amplitude curve, wherein the loss function comprises a deviation loss term that depends on a deviation of the estimated magnetization profile from the target magnetization profile.

5. The computer implemented method according to claim 1, wherein the asymmetric RF pulse comprises a nuclear spin inversion pulse or a refocusing pulse.

6. The computer implemented method according to claim 1, wherein the RF amplitude curve is represented an evaluation of:

$F1(t) \sim \text{sech}(\beta'' T(t))$, wherein $\beta''$ represents a first RF curve parameter of the at least one RF curve parameter.

7. A data processor comprising one or more processors configured to execute the computer implemented method according to claim 1.

8. The computer implemented method according to claim 4, wherein the loss function comprises a smoothness loss term that depends on a smoothness of the estimated magnetization profile.

9. The computer implemented method according to claim 4, wherein computing the first RF amplitude comprises:

optimizing the RF amplitude curve using a further loss function by using the at least one RF curve parameter as at least one further optimization variable; and computing the first RF amplitude as the optimized RF amplitude curve.

10. The computer implemented method according to claim 6, wherein T(t) is represented as an evaluation of:

$$T(t) = \frac{\tau_1 t^5 + \tau_2 t^3 + t}{\tau_1 + \tau_2 + 1},$$

wherein:

$\tau_1$ represents a second RF curve parameter of the at least one RF curve parameter and $\tau_2$ represents a third RF curve parameter of the at least one RF curve parameter.

11. The computer implemented method according to claim 9, wherein the further loss function does not depend on a pulse energy of the RF amplitude curve.

12. The computer implemented method according to claim 9, wherein optimizing the RF amplitude curve comprises, for each further iteration of a plurality of further iterations:

computing a current RF amplitude curve by selecting a respective current value for each of the at least one RF curve parameter; and computing a further estimated magnetization profile depending on the current RF amplitude curve, wherein the further loss function comprises a further deviation loss term that depends on a deviation of the further estimated magnetization profile from (i) the target magnetization profile, or (ii) a predefined further target magnetization profile.

13. The computer implemented method according to claim 9, wherein the asymmetric RF pulse comprises a gradient-modulated pulse, and further comprising:
receiving a first gradient amplitude curve that depends on at least one gradient curve parameter, and
wherein optimizing the RF amplitude curve comprises:
jointly optimizing the RF amplitude curve and the first gradient amplitude curve using the further loss function with the at least one RF curve parameter and the at least one gradient curve parameter as further optimization variables, and
wherein a slice selection gradient for a gradient-modulation for the predefined first part of the time interval is provided via the optimized first gradient amplitude curve.

14. The computer implemented method according to claim 12, wherein the further loss function comprises a further smoothness loss term that depends on a smoothness of the further estimated magnetization profile.

15. The computer implemented method according to claim 13, wherein the first gradient amplitude curve is represented an evaluation of:

$F3_1(t) \sim 1 - f\mathrm{sech}(\beta T(t))$, wherein:

$\beta$ represents a first gradient curve parameter of the at least one gradient curve parameter,
f represents a second gradient curve parameter of the at least one gradient curve parameter, and
T(t) represents a predefined time driving function.

16. The computer implemented method according to claim 13, further comprising:
receiving a second gradient amplitude curve that depends on at least one further gradient curve parameter;
computing a combined gradient amplitude curve for the time interval by combining the optimized first gradient amplitude curve for the predefined first part of the time interval and the second gradient amplitude curve for the curve second part of the time interval; and
optimizing the combined RF amplitude curve by jointly optimizing the combined RF amplitude curve and the combined gradient amplitude curve using the at least one RF curve parameter and the at least one further gradient curve parameter as optimization variables, wherein the slice selection gradient for the gradient-modulation for the time interval is provided via the optimized combined gradient amplitude curve.

17. The computer implemented method according to claim 13, wherein jointly optimizing the RF amplitude curve and the first gradient amplitude curve comprises, for each further iteration of the plurality of further iterations:
computing a current first gradient amplitude curve by selecting a respective current value for each of the at least one gradient curve parameter; and
computing the further estimated magnetization profile depending on the current RF amplitude curve and the current first gradient amplitude curve.

18. The computer implemented method according to claim 16, wherein the second gradient amplitude curve is represented an evaluation of:

$$F3_2(t) \sim \frac{1-f'}{1-\delta f}(1 - (f' - \delta f)\mathrm{sech}(\beta' T(t))),$$

f' represents a predefined constant,
$\beta'$ represents a first further gradient curve parameter of the at least one further gradient curve parameter, and
$\delta f$ represents a second further gradient curve parameter of the at least one further gradient curve parameter.

19. The computer implemented method according to claim 16, wherein jointly optimizing the combined RF amplitude curve and the combined gradient amplitude curve comprises, for each iteration of the plurality of iterations:
computing a current combined gradient amplitude curve by selecting a respective current value for each of the at least one further gradient curve parameter; and
computing the estimated magnetization profile depending on the current combined RF amplitude curve and depending on the current combined RF amplitude curve.

20. The computer implemented method according to claim 16, further comprising:
computing a frequency curve of the RF pulse for the time interval depending on the optimized combined RF amplitude curve and the optimized combined gradient amplitude curve.

\* \* \* \* \*